R. RHETT.
VOLUTE-SPRING MOTOR.
No. 183,208. Patented Oct. 10, 1876.
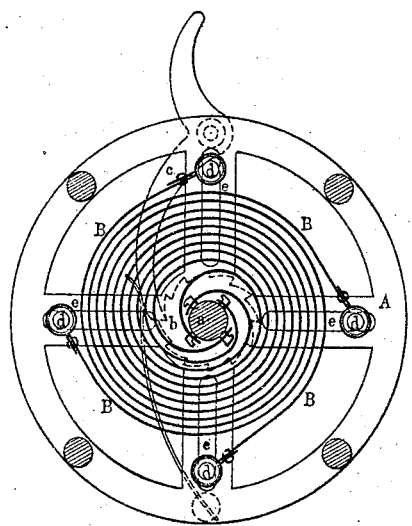
FIG. I.
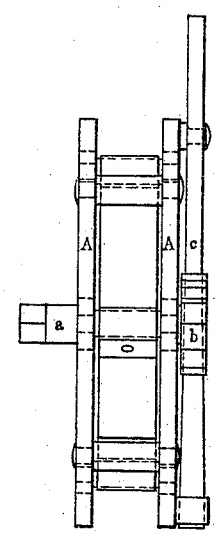
FIG. II.
WITNESSES.
Wm. H. Towson
W. W. Wharton
INVENTOR.
Roland Rhett,
by G. H. & W. T. Howard,
Attys.
JAMES R OSGOOD & CO BOSTON

UNITED STATES PATENT OFFICE.

ROLAND RHETT, OF BALTIMORE, MARYLAND.

IMPROVEMENT IN VOLUTE-SPRING MOTORS.

Specification forming part of Letters Patent No. 183,208, dated October 10, 1876; application filed April 20, 1876.

*To all whom it may concern:*

Be it known that I, ROLAND RHETT, of the city of Baltimore and State of Maryland, have invented certain Improvements in Volute-Spring Motors, of which the following is a specification; and I do hereby declare that in the same is contained a full, clear, and exact description of my said invention, reference being had to the accompanying drawing, and to the letters of reference marked thereon.

This invention relates to a motor in which a series of volute springs are attached directly to the central winding-spindle, and adapted to coil and uncoil in the same plane, the said springs being arranged within the cage, in which they are confined to occupy a space the width of which is equal to that of a single spring, as and for purposes hereinafter fully described.

In the further description of my invention which follows, due reference must be had to the accompanying drawing, forming a part of this specification, and in which—

Figure 1 is a sectional view of the cage, showing the manner of attaching the springs thereto; and Fig. 2, an edge view of the same.

Similar letters of reference indicate similar parts in both figures.

A is the cage, and B the springs, preferably attached at their inner ends to the central winding shaft or spindle $a$, as shown in the drawing, Fig. 1. The central winding-shaft is provided with a ratchet-wheel, $b$, and pawl $c$, to prevent a reverse or retrograde movement of the shaft, independently of the cage, during or after the coiling of the springs B. The outer ends of the springs B are connected to the cage A by means of pins $d$, which are susceptible of a radial movement within the slots $e$.

The slots $e$ may be either curved or straight, as will be found in practice best adapted to admit of a free and regular movement of the pins $d$ toward and from the winding-shaft in the coiling and uncoiling of the springs.

In using a series of springs attached to the cage at points equidistant from each other, as shown, the springs are made to occupy the same relative positions with reference to the winding-shaft; consequently, the tendency of the springs to be drawn toward one side in the winding operation is prevented, the strain being equal in all directions.

Another advantage of my improvements consists in that an increase in the number of springs employed does not affect the width of the cage, or require any additional cages, thereby adapting the motor for use in limited spaces, or where increased weight would be objectionable.

Having thus described my invention, what I claim as new, and wish to secure by Letters Patent of the United States, is—

1. In a spring-motor, a series of volute springs, the outer ends of which are attached to the cage, in which they are confined at points equidistant, or nearly equidistant, from each other, and the inner ends connected to the central winding-shaft, the said springs being arranged to move in the same plane in the coiling and uncoiling operation, substantially as and for the purpose set forth.

2. The cage A, having the radial slots $e$, in combination with a series of volute springs, the outer ends of which are adapted to have a free radial movement in the coiling and uncoiling of the same, by means of a central winding-shaft, to which the inner ends of the said springs are attached, substantially as and for the purpose specified.

In testimony whereof I have hereunto subscribed my name this 14th day of April, in the year of our Lord 1876.

ROLAND RHETT.

Witnesses:
 THOS. MURDOCH,
 JOSEPH CRAGG.